United States Patent
Takamoto

(10) Patent No.: US 6,877,755 B2
(45) Date of Patent: Apr. 12, 2005

(54) SHIFT CONTROL APPARATUS FOR A BICYCLE TRANSMISSION THAT OPERATES WHEN SIGNALS ARE DETECTED

(75) Inventor: Ryuichirou Takamoto, Sakai (JP)

(73) Assignee: Shimano, Inc., Sakai (JP)

( * ) Notice: Subject to any disclaimer, the term of this patent is extended or adjusted under 35 U.S.C. 154(b) by 0 days.

(21) Appl. No.: 10/605,245

(22) Filed: Sep. 17, 2003

(65) Prior Publication Data

US 2004/0112161 A1 Jun. 17, 2004

(30) Foreign Application Priority Data

Sep. 19, 2002 (JP) .......................................... 2002-272503

(51) Int. Cl.$^7$ ............................................... B62M 1/02
(52) U.S. Cl. ......................................... 280/260; 474/70
(58) Field of Search ................................ 280/259, 260, 280/261; 474/69, 70

(56) References Cited

U.S. PATENT DOCUMENTS

| 4,490,127 A | * | 12/1984 | Matsumoto et al. | ......... 474/110 |
| 5,059,158 A | * | 10/1991 | Bellio et al. | .................... 474/70 |
| 5,599,244 A | * | 2/1997 | Ethington | ..................... 474/70 |
| 6,047,230 A | * | 4/2000 | Spencer et al. | ............... 701/57 |
| 6,367,833 B1 | * | 4/2002 | Horiuchi | ...................... 280/260 |
| 2003/0160420 A1 | * | 8/2003 | Fukuda | ........................ 280/260 |

* cited by examiner

Primary Examiner—Kevin Hurley
(74) Attorney, Agent, or Firm—James A. Deland

(57) ABSTRACT

A shift control apparatus for a bicycle transmission comprises a signal detector that detects signals corresponding to motion of the bicycle, a threshold setting unit that sets a shift threshold value, and a time interval calculating unit that calculates time intervals after signals are detected. A control unit provides a signal to change a gear in the bicycle transmission only after a time interval between successive first and second signals passes the shift threshold value and the second signal is detected by the signal detector.

20 Claims, 12 Drawing Sheets

Fig. 4

| SHIFT LEVEL | UPSHIFTING PERIOD (U) (ms) | | 2ND DOWNSHIFTING PERIOD (D2) (ms) | | 1ST DOWNSHIFTING PERIOD (D1) (ms) | |
|---|---|---|---|---|---|---|
| 1 | 43.5 | U (1) | 0 | D2 (1) | 0 | D1 (1) |
| 2 | 30.1 | U (2) | 45.8 | D2 (2) | 48.3 | D1 (2) |
| 3 | 255 | U (3) | 31.7 | D2 (3) | 33.4 | D1 (3) |

Fig. 5

| | RATE OF ROTATION OF CRANK IMMEDIATELY BEFORE SHIFTING (rpm) | NUMBER OF DETERMINATIONS | DECISION TIME (s) | PULSATION PERIOD (s) |
|---|---|---|---|---|
| D2 (3) | 42.5 | 20 | 0.72 | 0.71 |
| D1 (3) | 30 | 1 | 0.05 | 1 |
| D2 (2) | 42.5 | 15 | 0.74 | 0.71 |
| D1 (2) | 30 | 1 | 0.07 | 1 |
| U (2) | 60 | 15 | 0.52 | 0.5 |
| U (1) | 60 | 11 | 0.52 | 0.5 |

Fig. 12

| SHIFT LEVEL | UPSHIFTING PERIOD (U) (ms) | 2ND DOWNSHIFTING PERIOD (D2) (ms) | 1ST DOWNSHIFTING THRESHOLD VALUE (D1) (ms) |
|---|---|---|---|
| 1 | 0.92 | 0 | 0 |
| 2 | 0.92 | 1.47 | 2 |
| 3 | 700 | 1.47 | 2 |

| | U(1) | D2(1) | D1(1) |
| | U(2) | D2(2) | D1(2) |
| | U(3) | D2(3) | D1(3) |

US 6,877,755 B2

SHIFT CONTROL APPARATUS FOR A BICYCLE TRANSMISSION THAT OPERATES WHEN SIGNALS ARE DETECTED

BACKGROUND OF INVENTION

The present invention is directed to bicycles and, more particularly, to a shift control apparatus for a bicycle transmission that operates when signals are detected.

Bicycle transmissions are available as external shifting mechanisms and internal shifting mechanisms. External shifting mechanisms may include a plurality of sprockets fitted on the rear wheel of the bicycle and a derailleur that switches a chain among the plurality of sprockets. Internal shifting mechanisms include planetary gear mechanisms disposed within a hub fitted to the rear wheel. Conventional bicycle transmissions are connected by a shift control cable to a shift lever attached to the bicycle handlebars, for example, and manual operation of the shift lever allows the optimal transmission gear ratio to be selected according to riding conditions.

Many modern bicycles use shift control units that automatically select the optimum transmission gear ratio according to riding conditions (e.g., wheel speed, crank RPM, and so on). Such a system is shown in Japanese Unexamined Patent Application Publication 8-198,174. In such systems, a signal detector such as reed switch may be used to detect the passage of a magnet mounted to one of the bicycle wheels, for example. The reed switch produces a pulse each time the magnet passes by the reed switch, and the wheel speed may be calculated from the time interval between successive pulses and the wheel diameter. Two threshold values, an upshift threshold value and a downshift threshold value, may be set for each transmission gear ratio. The bicycle transmission is upshifted when the detected speed exceeds the upshift threshold value, and the bicycle is downshifted when the detected speed falls below the downshift threshold value. When the time interval between detected pulses is used to calculate the wheel speed, upshifting occurs when the time interval is less than the upshift threshold value, and downshifting occurs when the time interval is greater than the downshift threshold value. Sometimes pulses are detected from an alternating-current generator, wherein a plurality of pulses are detected for each rotation of the wheel. The increased number of pulses allow quicker response to changing riding conditions.

In conventional systems, upshifting and downshifting is performed according to a time interval after a detected pulse regardless of whether further pulses are detected. As such, there is the possibility of unanticipated shifting, particularly downshifting, when pulses cannot be detected due to malfunctions in the sensor, broken wiring, and so on. When unanticipated downshifting occurs during intense peddling, a heavy shock is communicated to the legs, thus possibly adversely affecting the rider. When pulses are detected from an alternating-current generator, the increased number of pulses for each rotation of the wheel also increase the number of times that unintended downshifting against the will of the rider may occur.

SUMMARY OF INVENTION

The present invention is directed to various features of a shift control apparatus for a bicycle. In one embodiment, a shift control apparatus for a bicycle transmission comprises a signal detector that detects signals corresponding to motion of the bicycle, a threshold setting unit that sets a shift threshold value, and a time interval calculating unit that calculates time intervals after signals are detected. A control unit provides a signal to change a gear in the bicycle transmission only after a time interval between successive first and second signals passes the shift threshold value and the second signal is detected by the signal detector. Additional inventive features will become apparent from the description below, and such features alone or in combination with the above features may form the basis of further inventions as recited in the claims and their equivalents.

BRIEF DESCRIPTION OF DRAWINGS

FIG. 4 is a particular embodiment of a table of shift threshold period values;

FIG. 5 is a particular embodiment of a table showing relationships between crank rotation rates and signal periods;

FIG. 12 is another embodiment of a table of shift threshold period values; and

DETAILED DESCRIPTION

Figure 1:
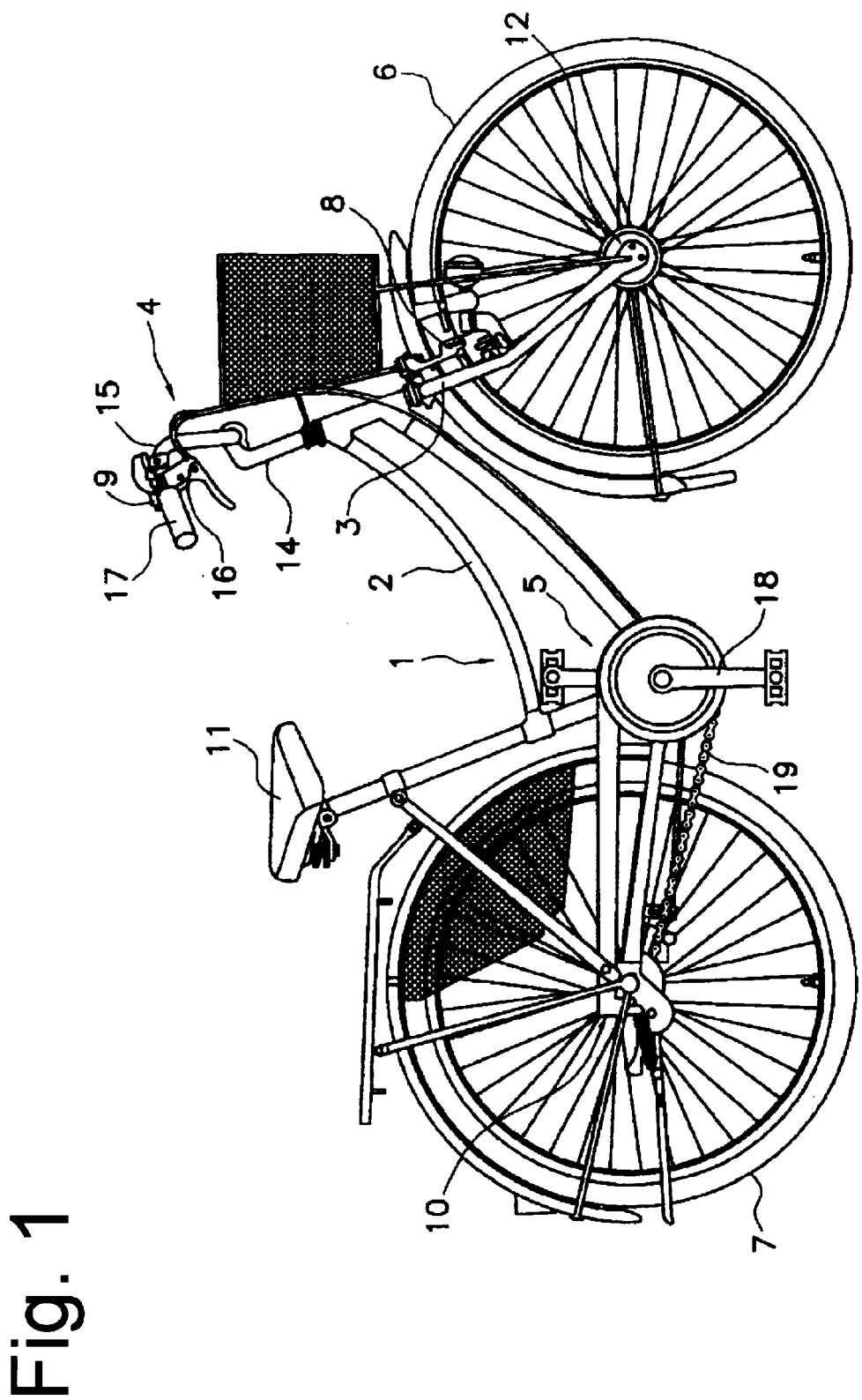
FIG. 1 is a side view of a particular embodiment of a bicycle.

FIG. 1 is a side view of a particular embodiment of a bicycle. In this embodiment, the bicycle is a touring bicycle comprising a frame 1 in the form of a double-loop frame body 2; a front fork 3; a handlebar assembly 4 mounted to the top of fork 3; a driving assembly 5; a front wheel 6 to which a generating hub 12 is attached; a rear wheel 7 to which a three-speed internal shifting hub 10 is attached; front and rear braking units 8 (only the front braking unit is shown); a shift control apparatus 9 for controlling the internal shifting hub 10, and a seat 11 attached to the middle of the frame.

Handlebar assembly 4 comprises a handle stem 14 attached to the top of fork 3 and a handlebar 15 attached to the top of handle stem 14. A brake lever 16 for operating a corresponding braking unit 8 and a grip 17 are attached to each side of the handlebar 15. In this embodiment, the shift control apparatus 9 is attached to the right-side brake lever 16.

The driving assembly 5 comprises a crank 18, to which a front sprocket is attached, internal shifting hub 10, to which a rear sprocket is attached, and a chain 19 that engages the front and rear sprocket. Internal shifting hub 10 is a three-speed hub with three gear ratios and a locking position. Thus, internal shifting hub 10 is switched among a total of four positions. In the locking position, rotation of the internal shifting hub 10 is prevented or significantly impeded.

Figure 2:
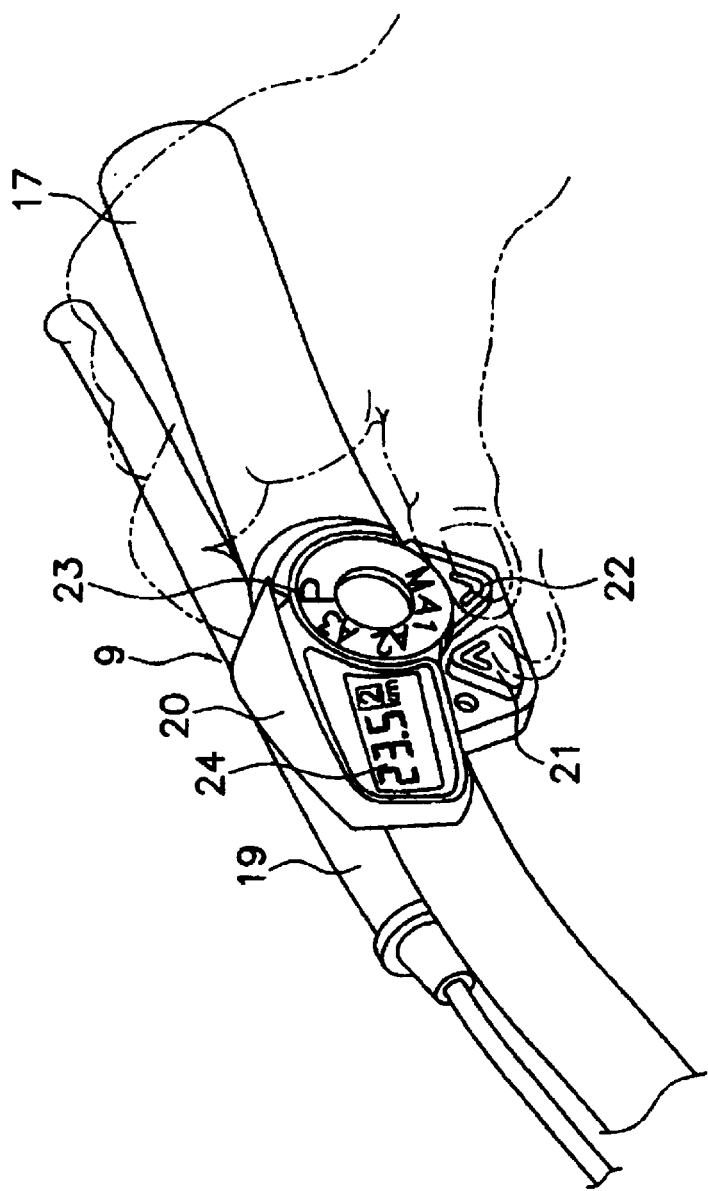
FIG. 2 is an oblique view of components mounted to the bicycle handlebar.

As shown in FIG. 2, shift control apparatus 9 comprises a housing 20 integrally formed with the right-side brake lever 16; two operation buttons 21 and 22 in the form of triangular push buttons disposed laterally adjacent to each other on the lower portion of housing 20; an operation dial 23 disposed above the operation buttons 21 and 22; and a liquid crystal display 24 disposed to the left of the operation dial 23. A shift control unit 25 (FIG. 3) is disposed inside the housing 20 for controlling the operation of the internal shifting hub 10.

The operation dial 23 has five stop positions P, A1, A2, A3, and M, and it is used for switching between four shifting modes and a parking (P) mode. In this embodiment, the four shifting modes comprise three automatic shifting modes (A1–A3) and a manual shifting mode (M). The automatic shifting modes are used to automatically shift the internal shifting hub 10 according to wheel speed signals derived from the generating hub 12. In this embodiment, automatic shifting mode (A1) is used for riding over mountain roads with steep hills; automatic shifting mode (A2) is used for riding under normal terrain variations, and automatic shifting mode (A3) is used for riding over flat terrain at high speeds. The operation buttons 21 and 22 are used to shift the internal shifting hub in manual shifting mode (M). More specifically, the left-side operation button 21 is used for shifting from a low speed level to a high speed level, and the right-side operation button 22 is used for shifting from a high speed level to a low speed level. Thus, the shifting modes can be freely selected to suit the riding conditions and the preferences of the rider. Parking mode (P) is used primarily for antitheft purposes wherein the internal shifting hub 10 is set in the locking position noted above. The current riding speed and the current transmission gear is displayed in the liquid crystal display 24.

Figure 3:
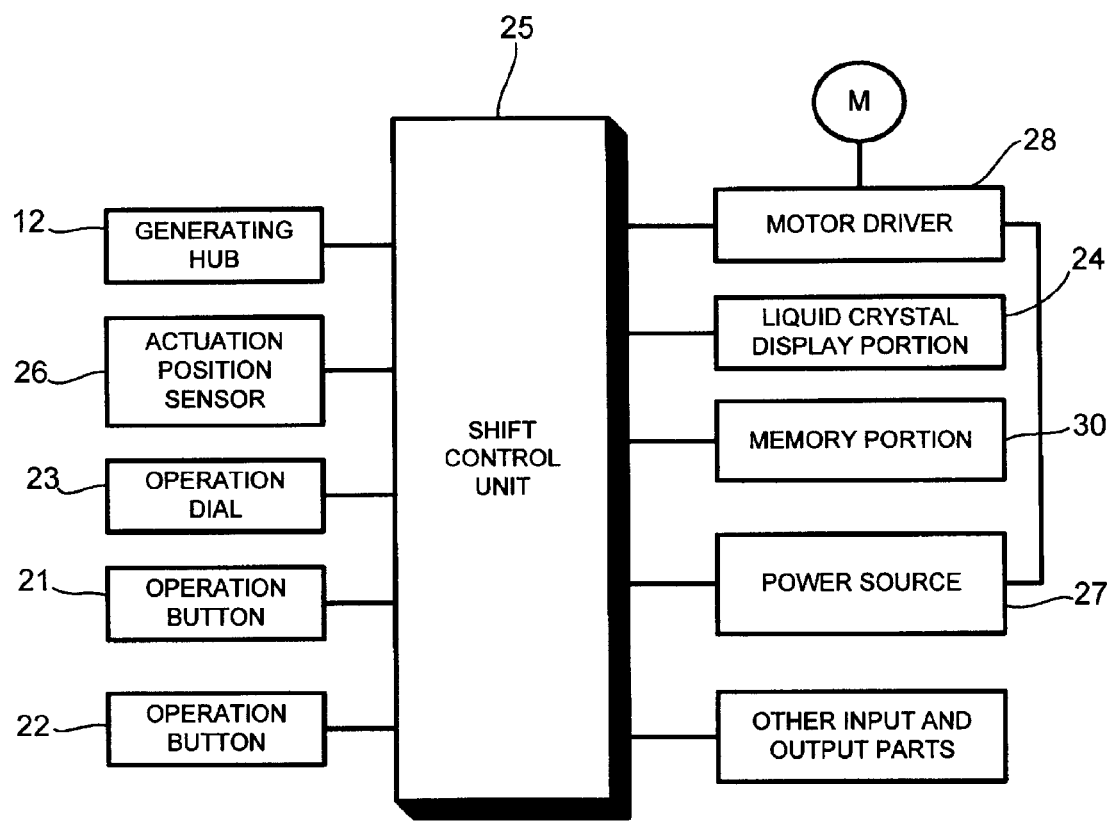
FIG. 3 is a block diagram of a particular embodiment of a shift control apparatus for a bicycle transmission.

Shift control unit 25 is equipped with a microcomputer comprising a CPU, a RAM, a ROM, and an I/O interface. As shown in FIG. 3, connected to shift control unit 25 are the generating hub 12; an actuation position sensor 26 comprising, for example, a potentiometer that detects the actuation position of the internal shifting hub 10; the operation dial 23; the operation buttons 21 and 22; a power source 27 comprising a battery; a motor driver 28 that drives a shifting motor 29 for switching the internal shifting hub 10 to the four positions noted above, the liquid crystal display 24, a memory 30, and other input and output parts. The power source 27, which can be a primary battery such as a dry cell or a secondary battery such as a lithium-hydrogen battery, supplies electricity to shift control unit 25 and motor driver 28. Shift control unit 25 controls the shifting motor 29 in accordance with each operating mode and controls the information displayed on liquid crystal display 24.

The generating hub 12 may be, for example, a 28-pole alternating-current generator that generates 14 pulses for each rotation of the front wheel 6, and shift control unit 25 calculates a wheel speed S from these pulses. The large number of pulses for each rotation of the wheel provides very accurate resolution of the wheel speed, so shift control can be performed very precisely.

Memory portion 30 may comprise, for example, a writable, nonvolatile memory such as an EEPROM. Memory 30 may store various data such as a code used for the parking mode and tire diameter data used to calculate bicycle speed. Memory 30 also may store threshold values for upshifting and downshifting internal shifting hub 10 when the bicycle is being operated in an automatic mode. FIG. 4 shows examples of shift threshold values expressed as periods, wherein such values may be used in automatic shifting mode (A2). In this embodiment, lower-speed threshold period values D1 and higher speed threshold period values D2 are set for downshifting operations.

In this embodiment, the upshifting and downshifting threshold values of each gear are set based on a desired crank RPM. For example, as shown in FIG. 5, the upshifting period U is based on a crank RPM of 60, the first downshifting period is based on a crank RPM of 30, and the second downshifting period is based on a crank RPM of 42.5. Assuming a wheel circumference of 2 meters and 14 pulses output by generating hub 12 per wheel revolution, then, as shown in FIG. 4, the upshifting period U (1) in first gear is set at 43.5 ms when the bicycle is moving at 11.8 km/h, and the upshifting period U (2) in second gear is set at 30.1 ms when the bicycle is moving at 17.1 km/h. The second downshifting period D2 (3) in third gear is set at 31.7 ms when the bicycle is moving at 16.2 km/h, and the second downshifting period D2 (2) in second gear is set at 45.8 ms when the bicycle is moving at 11.2 km/h. The first downshifting period D1 (3) in third gear is set at 33.4 ms when the bicycle is moving at 15.4 km/h, and the first downshifting period D2 (2) in second gear is set at 48.3 ms when the bicycle is moving at 10.6 km/h. In general, the downshifting periods D1 and D2 in automatic shifting mode A1 are set to larger values (slower wheel speeds), and the downshifting periods D1 and D2 in automatic shifting mode A3 are set to smaller values (faster wheel speeds).

In this embodiment, it is desirable to upshift according to the upshifting periods or to downshift according to the second downshifting periods only after the corresponding shift threshold has been passed for more than one-half of a crank revolution. This allows transient variations in pedal cadence and bicycle speed to be taken into account. The table shown in FIG. 5 shows how this is carried out. Since the upshifting periods are set based on a desired crank RPM of 60, and since the period is the reciprocal of RPM, the period for one half of a crank revolution at 60 RPM is 0.5 second. The time to decide whether to upshift thus may be set a little longer than that, such as 0.52 second for both first and second gears. The period for one half of a crank revolution at 42.5 RPM is 0.71 second, and the time to decide whether to downshift using the downshifting periods D2 is set at 0.72 second for third gear and 0.74 second for second gear.

In this embodiment, the gear ratios for the first, second and third gears of the internal shifting hub 10 are 0.073, 1.0 and 1.360, respectively. There are 33 teeth on the front sprocket (not shown) attached to the crank 18, and there are 16 teeth on the rear sprocket attached to the rear wheel 7. Thus, the net gear ratio for each is 1.51, 2.06, and 2.81, respectively. If 14 pulses are produced by generating hub 12 for each wheel revolution, then 11 pulses would be detected in the 0.52 second upshift decision time in first gear, and 15 pulses would be detected in the 0.52 second upshift decision time in second gear. Twenty pulses would be detected in the 0.72 second downshift decision time in third gear, and 15 pulses would be detected in the 0.74 second downshift decision time in second gear.

Figure 10A:
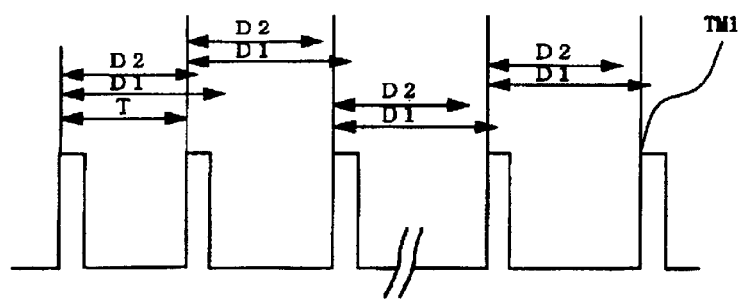
FIGS. 10(A)–10(C) are timing charts showing various downshift timings.
Figure 10B:
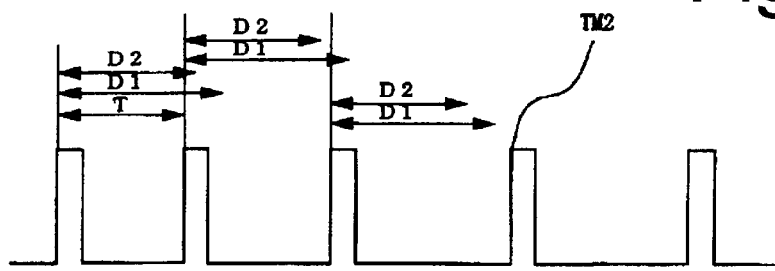
Figure 10C:
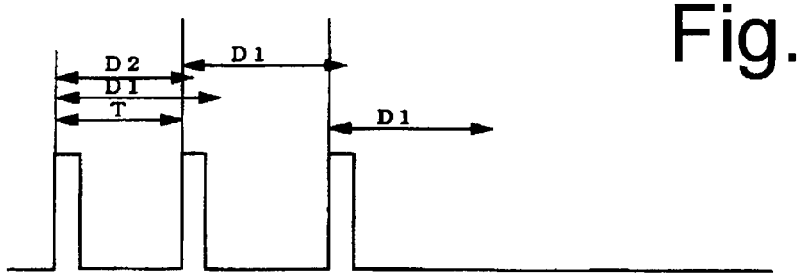

As shown in FIG. 10(A), downshifting takes place at point TM1 in this embodiment if the period T of a plurality of successive pulse signals S is greater than the second downshifting period D2 for the current gear. As shown in FIG. 10(B), downshifting takes place at point TM2 in this embodiment if the period T of a detected pulse signal S is greater than the first downshifting period D1 for the current gear, regardless of the detected speed before then. Since only one period is measured in this case, the downshift decision time in FIG. 5 for the first downshifting period may be set at 0.05 second in third gear and 0.07 second in second gear. As shown in FIG. 10(C), the current gear is maintained when a pulse is not detected due to a broken wire, a faulty connection, or some other problem with the electrical components. Thus, downshifting against the will of the rider is avoided.

Figure 6:
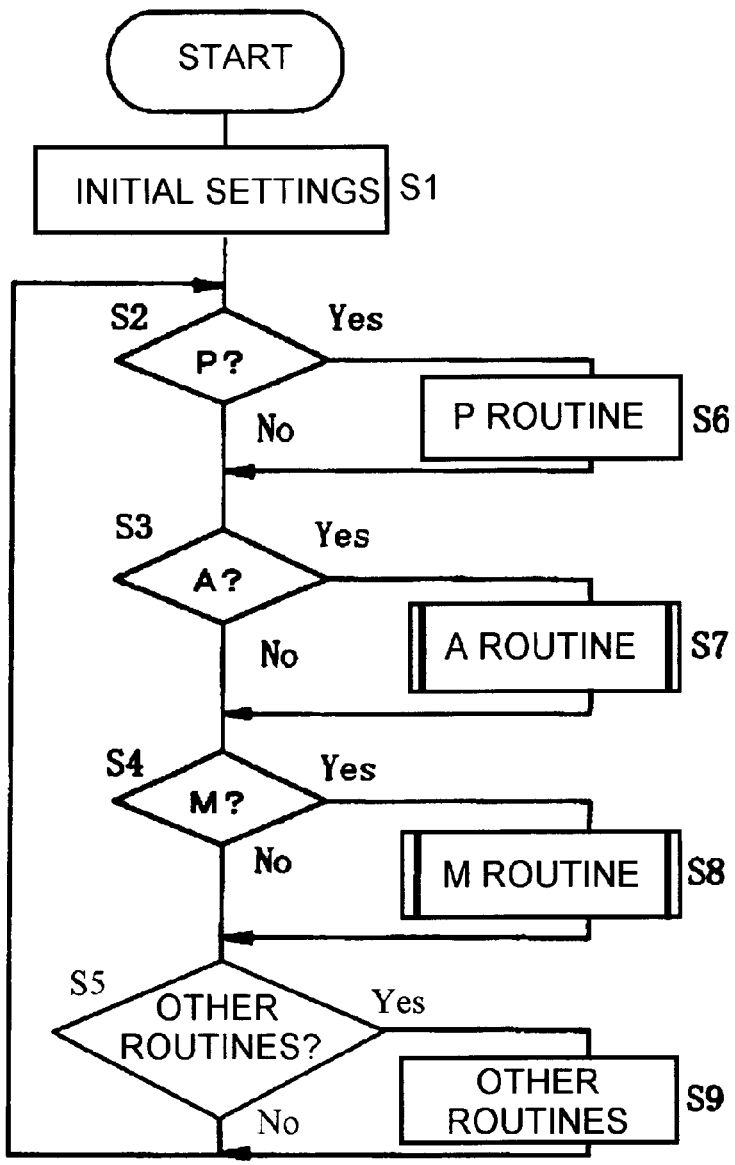
FIG. 6 is a flowchart of a particular embodiment of a main routine used in the shift control apparatus.

FIGS. 6–9 are flowcharts showing the operation of the shift control unit 25. As shown in FIG. 6, initial settings are made in a step S1 when the power source is turned on. For example, wheel data (e.g., 26-inch wheel diameter) may be set for use in calculating speed, the current gear may be set to second gear (VP=2), and various flags may be reset. It is determined in step S2 whether or not the operation dial 23 is set to parking (P) mode. If so, then processing moves from step S2 to step S6, and a parking (P) routine is performed. This routine may include a code-registration routine that registers a code for unlocking the internal shifting hub 10 or a code-input routine that checks in input code against the registered code to determine whether the internal shifting hub should be unlocked. Both routines may use input from the operation of the operation buttons 21 and 22.

If the operation dial has not been set to parking (P) mode, then it is determined in step S3 whether or not the operation dial 23 is set to an automatic shifting (A) mode (i.e., set to one of the positions A1–A3). If so, then processing moves from step S3 to step S7, and an automatic shifting (A) routine (FIGS. 7 and 8) is performed for the desired mode. If the operation dial has not been set to an automatic shifting (A) mode, then it is determined in step S4 whether or not the operation dial 23 is set to manual shifting (M) mode. If so, then processing, moves from step S4 to step S8, and a manual shifting (M) routine (FIG. 9) is performed. If the operation dial 23 has not been set to manual shifting (M) mode, then it is determined in step S5 whether or not other routines (such as tire diameter input routines) are selected. If so, then processing moves from step S5 to step S9, and such other routines are executed.

In the automatic shifting (A) routine of step S7, the internal shifting hub 10 is set to the proper gear for the current bicycle speed and changed according to fluctuations in the bicycle speed. Only a description of the operation for automatic shifting mode (A2) will be provided, since processing for the automatic shifting modes (A1) and (A3) is the same except for the values of the upshifting and downshifting periods.

Figure 7:
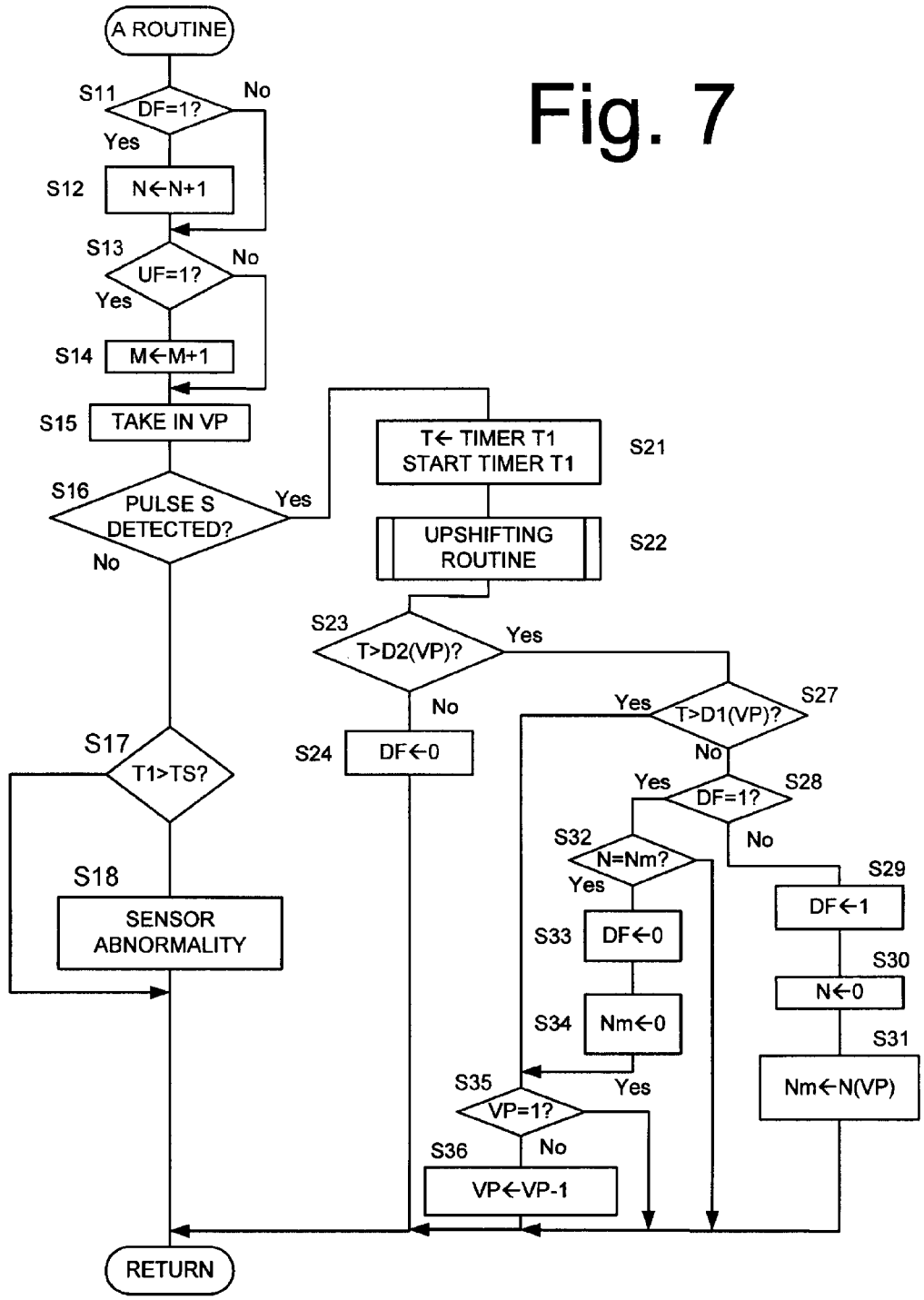
FIG. 7 is a flowchart of a particular embodiment of an automatic shifting routine used in the shift control apparatus.

As shown in FIG. 7, it is first determined in step S11 whether or not a downshift decision flag DF is set (DF=1). The downshift decision flag DF indicates the fact that a downshifting period D2 has been passed, and it is also used to determine whether the desired one half rotation of the crank 18 has occurred before downshifting is performed. If the downshift decision flag DF has been set, then processing moves to step S12, and a count variable N that indicates the number of pulses detected since the downshift decision flag DF was first set is incremented by one. If the downshift decision flag DF is not set, then step S12 is skipped, and it is determined in a step S13 whether or not an upshift flag UF is set (UF=1). The upshift decision flag UF indicates the fact that an upshifting period U has been passed, and it is also used to determine whether the desired one half rotation of the crank 18 has occurred before upshifting is performed. If the upshift decision flag UF has been set, then processing moves to step S14, and a count variable M that indicates the number of pulses detected since the upshift decision flag UF was first set is incremented by one. If the upshift decision flag UF is not set, then step S14 is skipped.

In step S15, the actuation position VP of the actuation-position sensor 26 is stored, and it is determined in step S16 whether or not a pulse signals S is detected based on the alternating-current signals from the generating hub 12. If no pulse has been detected, it is then determined in a step S17 whether or not a timer T1 that is reset with the detection of each pulse is greater than or equal to a predetermined time TS. If so, then it is concluded that there is a failure of pulse detection due to a sensor abnormality or for some other reason, and a notification of a sensor abnormality is given with a buzzer or a display message in a step S18. Then, the process returns to the main routine.

Figure 8:
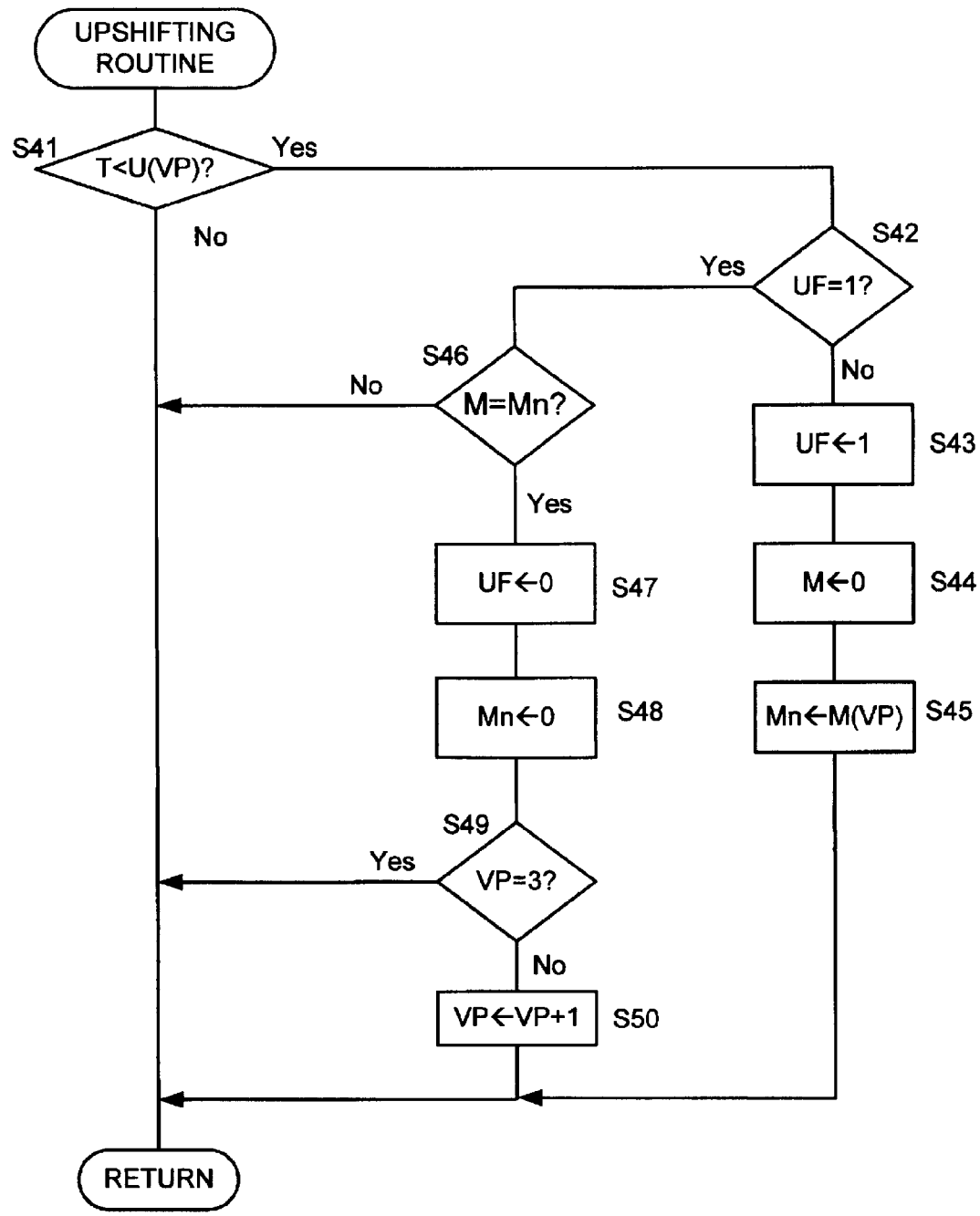
FIG. 8 is a flowchart of a particular embodiment of an upshifting routine used in the shift control apparatus.

If a pulse signal S is detected in step S16, then the value of timer T1 is stored as a period value T in a step S21, and timer T1 is reset and restarted. Thus, the timer T1 is used for measuring the period T of pulses generated from the generating hub 12. Then, in step S22, the upshifting routine shown in FIG. 8 is performed to determine whether or not the period T exceeds the upshifting period U (VP) shown in FIG. 4 for the current gear. More specifically, it is determined in a step S41 whether or not the period T is less than the upshifting period U (VP) for the current gear (e.g., whether the period T is shorter than 30.1 ms when the internal shifting hub 10 is in second gear). If not, then the process returns to the automatic shifting routine (A) in FIG. 7. Otherwise, it is determined in a step S42 whether or not the upshift decision flag UF already has been set. This step is performed primarily to determine whether or not this is the first time that the period T of the pulses has passed the upshifting period U (VP) for the current gear. If the upshift decision flag UF is not set, then this is the first time that the period T has passed the upshifting period U for the current gear. Accordingly, the upshift decision flag UF is set to 1 in a step S43, and a count variable M is reset to zero in a step S44. The count variable M represents the number of times the period T has successively passed the upshifting period U (VP) for the current gear. Then, a count value M (VP) corresponding to the number of determinations shown in FIG. 5 for the current gear is stored in a register Mn in a step S45. Since one such determination already has been made in step S41, the number stored in register Mn actually is the number of determinations shown in FIG. 5 minus one. For example, when the internal shifting hub 10 is in second gear, then Mn is set to 14. When the internal shifting hub 10 is in first gear, then Mn is set to 10. The process returns to the automatic shifting (A) routine after step S45.

If it is determined in step S42 that the upshift decision flag UF already has been set, then it is determined in a step S46 whether the count variable M has reached the number of determinations setting stored in register Nm. In other words, it is determined whether the period T of detected pulses has passed the upshifting period U (VP) for at least one-half rotation of the crank 18. If not, then the process returns to the automatic shifting routine (A) in FIG. 7. Otherwise, the upshift decision flag UF is reset in a step S47, and the register Mn is reset in a step S48. It is then determined in a step S49 whether or not the internal shifting hub 10 currently is in third gear. If so, then no further upshifting can take place, so the process returns to the automatic shifting (A) routine in FIG. 7. The upshifting period in third gear is set to 255 ms, which is not possible under normal circumstances, so a "yes" determination at this point usually does not occur. If the internal shifting hub 10 is not in third gear at this time, then the actuation position VP is incremented by one in a step S50, the shifting motor 29 is actuated, and the internal shifting hub 10 is upshifted by one gear.

Returning to FIG. 7, it is determined in step S23 whether or not the period T is greater than the second downshifting period D2 (VP) for the current gear. If not, then speed is not decreasing, so the downshift decision flag DF is reset in step S24 to cancel any pending downshift determination, and the process returns to the main routine. On the other hand, if the period T is greater than the second downshifting period D2 (VP) for the current gear, it is then determined in a step S27 whether or not the period T is greater than the first downshifting period D1 for the current gear. As noted above, the first downshifting period D1 is associated with a lower speed than the second downshifting period D2. Thus, if the period T is greater than the first downshifting period D1 (e.g., greater than 48.3 ms in second gear), then the bicycle is decelerating rapidly, so the process moves to step S35 for immediate downshift processing. In step S35, it is determined whether or not the internal shifting hub 10 currently is in first gear. If so, then it is not possible to shift to a lower gear, so the process returns to the main routine. Otherwise, the actuation position VP is decremented by one, the shifting motor 29 is activated, and the internal shifting hub 10 downshifts by one gear. Such immediate processing accommodates rider fatigue, an uphill climb, and so on.

If it is determined in step S27 that the period T is less than the first downshifting period D1 (VP) for the current gear, then the period T is between the first downshifting period D1 and the second downshifting period D2, and the bicycle is in a state of gradual deceleration. It is then determined in a step S28 whether or not the downshift decision flag DF previously has been set. This step is performed primarily to determine whether or not this is the first time that the period T has fallen between the first downshifting period D1 and the second downshifting period D2.

If this is the first time that the period T has fallen between the first downshifting period D1 and the second downshifting period D2 (DF=0), then the downshift decision flag DF is set to 1 in a step S29, and a count variable N is reset to zero in a step S30. The count variable N represents the number of times the period T has been determined to be between the first downshifting period D1 and the second downshifting period D2. Then, a count value N (VP) corresponding to the number of determinations shown in FIG. 5 for the current gear is stored in a register Nm in a step S31. Since one such determination already has been made in step S27, the number stored in register Nm actually is the number of determinations shown in FIG. 5 minus one. For example, when the internal shifting hub 10 is in third gear, then Nm is set to 19. When the internal shifting hub 10 is in second gear, then Nm is set to 14. The process returns to the main routine after step S31.

If it is determined that the downshift decision flag DF already is set (i.e., this is not the first time that the period T has fallen between the first downshifting period D1 and the second downshifting period D2), then it is determined in a step S32 whether or not the count variable N has reached the number of determinations stored in register Nm. In other words, it is determined whether the period T of detected pulses has been between the downshifting periods D1 and D2 for at least one-half rotation of the crank. If not, then the process returns to the main routine. If so, then the downshift decision flag DF is reset in a step S33, the value in register Nm is reset in a step S34, and the process moves to step S35 to perform the downshift operation as noted above.

It should be readily apparent that when the period T is greater than the second downshifting period D2 (VP) for the current gear, downshifting is not immediately performed. Instead, downshifting is performed only when a plurality of successive periods T are greater than the second downshifting period D2 (VP) and less than the first downshifting period D1 (VP). Thus, if only one period is determined to be greater than the second downshifting period D2 (VP), the current gear is maintained to prevent downshifting against the will of the rider. In any event, downshifting is performed only when it is verified that pulses are being detected, so downshifting does not occur if pulses cannot be detected due to some malfunction in the electronic components.

Figure 9:
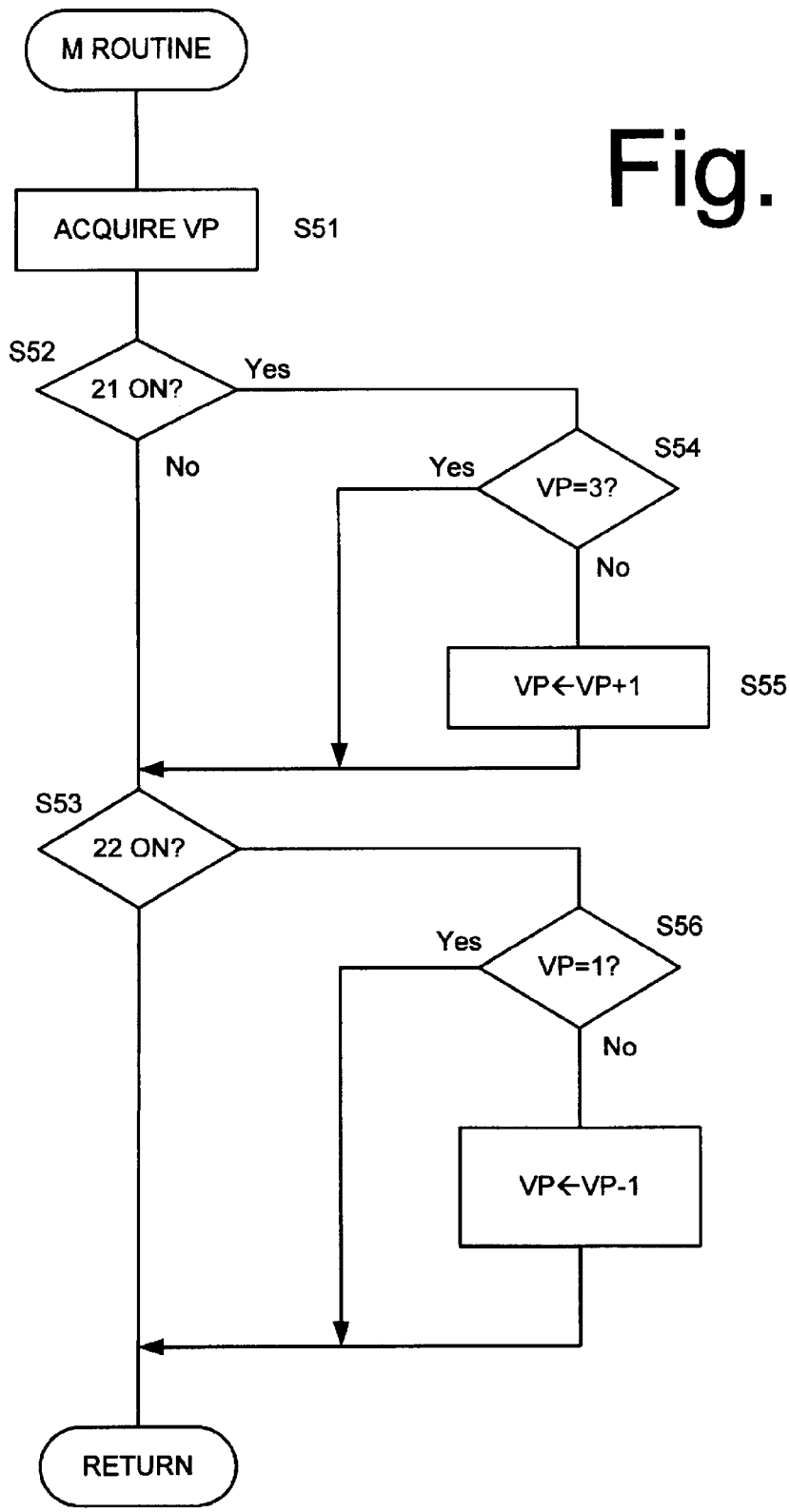
FIG. 9 is a flowchart of a particular embodiment of a manual shifting routine used in the shift control apparatus.

FIG. 9 is a flowchart of a particular embodiment of a manual shifting (M) routine used in the shift control unit 25. In general, internal shifting hub 10 is shifted by one gear for each operation of the operation buttons 21 and 22. The current gear indicated by the actuation position sensor 26 is acquired in a step S51, and then it is determined in a step S52 whether or not the operation button 21 is being operated. If so, it is determined in a step S54 whether or not the internal shifting hub 10 is in third gear. If so, then no further upshifting is possible, so the request is ignored. Otherwise, the actuation position VP is incremented by one, and the internal shifting hub 10 is upshifted by one gear. In any event, it is then determined in a step S53 whether or not the operation button 22 is being operated. If so, it is determined in a step S56 whether or not the internal shifting hub 10 is in first gear. If so, then no further downshifting is possible, so the request is ignored. Otherwise, the actuation position VP is decremented by one, and the internal shifting hub 10 is downshifted by one gear.

Figure 11:
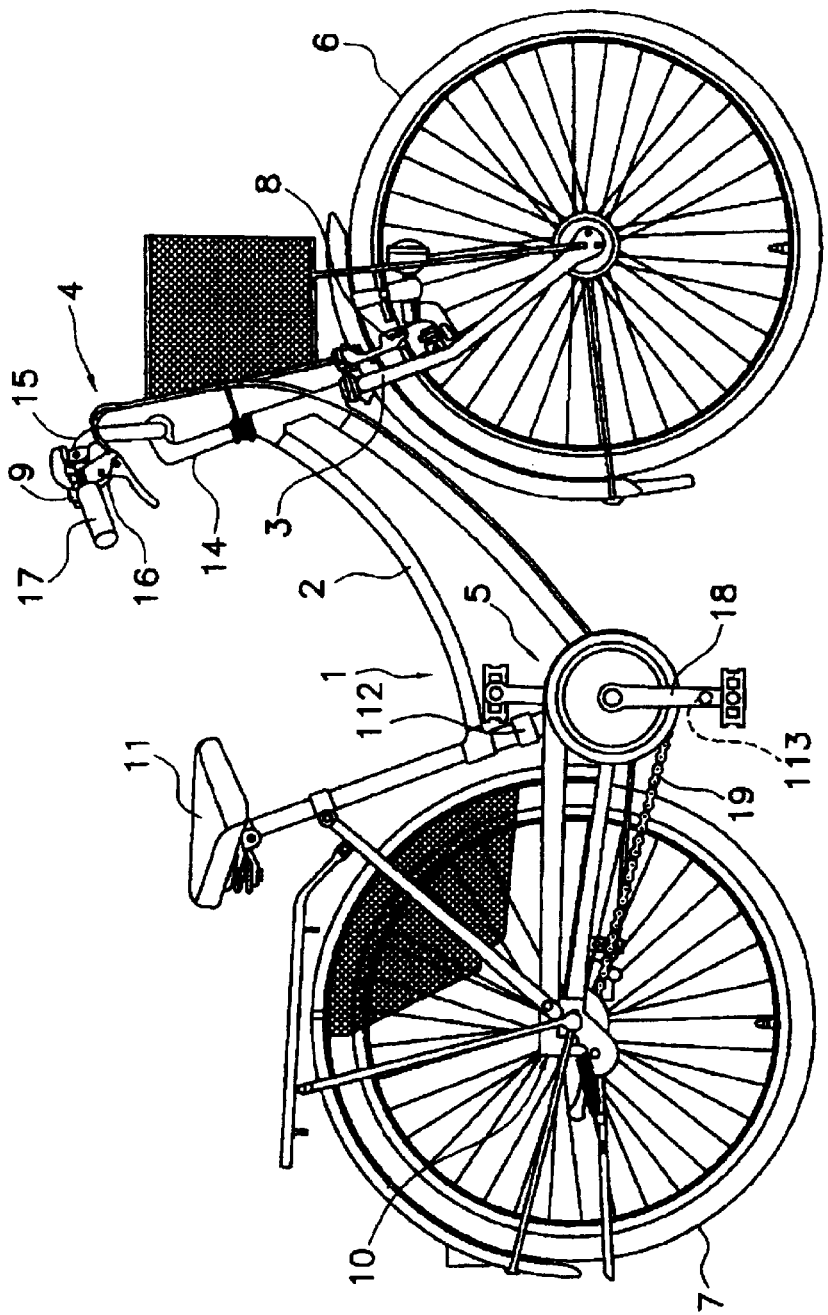
FIG. 11 is a side view of another embodiment of a bicycle.

In the above embodiment, wheel speed was used to control the operation of internal shifting hub 10, but crank RPM also can be used. FIG. 11 is a side view of an embodiment of a bicycle configured for this purpose. As shown in FIG. 11, a magnet or other detection unit 113 can be mounted to the crank 18, and the crank RPM can be detected with a rotation detector 112 comprising, for example, a reed switch mounted to the frame body 2 of the bicycle for detecting the passage of the detection unit 113. If desired, a plurality of detection units 113 and/or rotation detectors 112 can be provided to increase the number of signals detected per revolution of the crank 18.

FIG. 12 is an embodiment of a table of shift threshold period values that may be used with this embodiment. In this case, the table provides periods corresponding to the upper and lower limits of the crank RPM corresponding to each gear. In this embodiment, identical values are set for each gear, but the values can differ in other embodiments. As in the above embodiment, downshifting may be performed when the periods T of successive detected pulses are greater than the second downshifting period D2 (VP) and less than the first downshifting period D1 (VP) in automatic shifting mode, whereas a downshifting operation may be canceled if just one period is outside the range. Also, when the period T of a detected pulses is greater than the first downshifting period D1 (VP), downshifting can be performed when the next pulse is detected.

Figure 13:
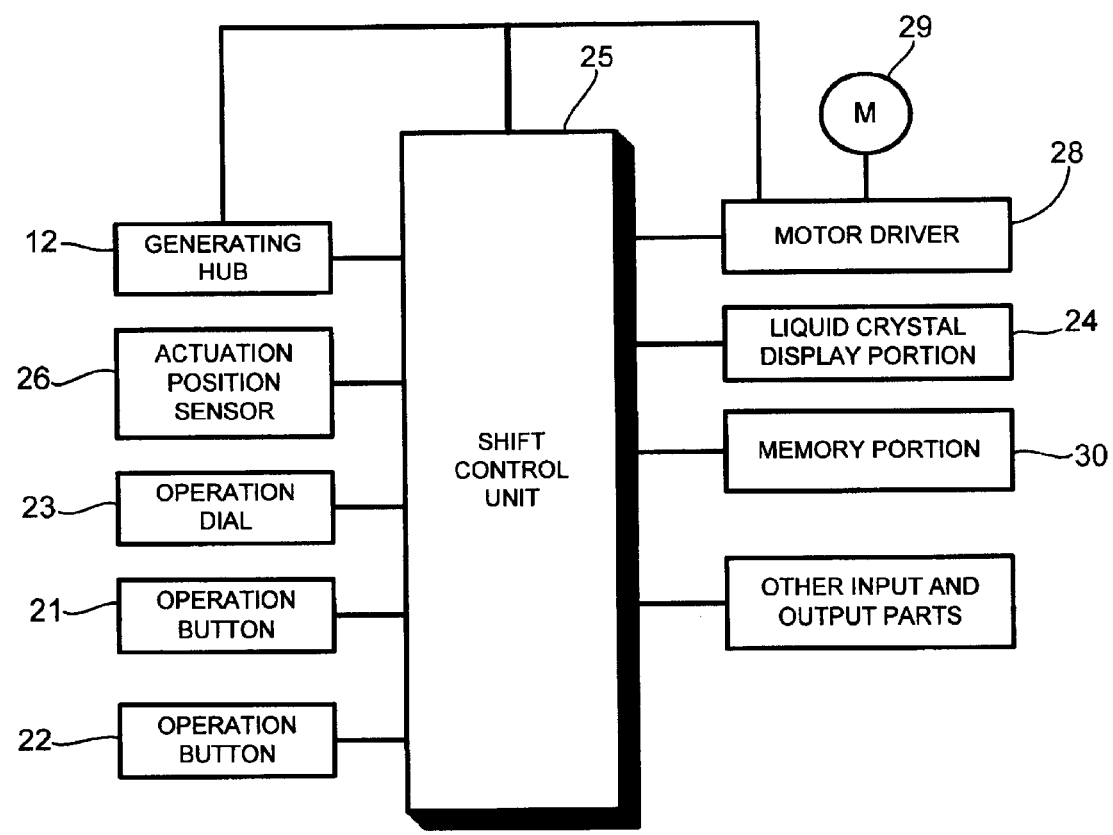
FIG. 13 is a block diagram of another embodiment of a shift control apparatus for a bicycle transmission.

While the above is a description of various embodiments of inventive features, further modifications may be employed without departing from the spirit and scope of the present invention. For example, electricity from a power source 27 was used as a source of power for the shifting motor 29 and the shifting control portion 25 in the described embodiments. However, as shown in FIG. 13, electricity supplied from the generating hub 12 also could be used as a source of power.

A three-speed internal shifting hub was provided as an example of a bicycle transmission, but the number of gears and the configuration of the bicycle transmission are not limited to the described embodiments. The teachings herein also can be applied to the control of an external bicycle transmission comprising a plurality of sprockets and a derailleur, for example. While a motor-powered bicycle transmission was used in the above embodiments, the teachings herein also can be applied to bicycle transmissions powered by a solenoid, an electrical, hydraulic, or air-pressure cylinder, or by another actuator.

While a second downshifting period D2 (VP) was used in the described embodiments, downshifting can be controlled using only a first downshifting period. While upshifting was performed only after a plurality of successive periods T were determined to be less than the upshifting period, upshifting could be performed immediately. Alternatively, two different upshifting periods could be set, with upshifting performed immediately when the detected period is shorter than the first upshifting period, and upshifting performed only after a plurality of successive periods are between the two upshifting periods.

Wheel speed was detected using pulses from the generating hub 12 in the described embodiments, but other speed detecting devices could be used. For example, a wheel-speed sensor comprising a reed switch or some other rotation detector could be provided on the front fork or on some other part of the bicycle body, and a magnet or some other detection unit could be mounted to the wheel. In this case, a plurality of magnets can be mounted in the direction of rotation.

The flowcharts and tables provided herein to illustrate the shift processing are exemplary only, as many other algorithms and parameters could be used to accomplish the same thing.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A shift control apparatus for a bicycle transmission comprising:
    a signal detector that detects signals corresponding to motion of the bicycle;
    wherein the signal detector is structured to detect the signals from an alternating current generator that rotates with a bicycle wheel;
    a threshold setting unit that sets a shift threshold value;
    a time interval calculating unit that calculates time intervals after the signals are detected; and
    a control unit that provides a signal to change a gear in the bicycle transmission only after a time interval between successive first and second signals corresponds to a value that passes the shift threshold value and the second signal is detected by the signal detector.

2. The apparatus according to claim 1 wherein the threshold setting unit sets a first downshift threshold value, and wherein the control unit provides a signal to downshift the bicycle transmission only after the time interval between the successive first and second signals corresponds to a value that passes the first downshift threshold value and the second signal is detected by the signal detector.

3. The apparatus according to claim 2 wherein the control unit provides the signal to downshift the bicycle transmission only after the time interval between the successive first and second signals corresponds to a value that is greater than the first downshift threshold value.

4. The apparatus according to claim 1 wherein the threshold setting unit sets an upshift threshold value, and wherein the control unit provides a signal to upshift the bicycle transmission only after the time interval between the successive first and second signals corresponds to a value that passes the upshift threshold value and the second signal is detected by the signal detector.

5. The apparatus according to claim 4 wherein the control unit provides the signal to upshift the bicycle transmission only after a plurality of time intervals between a corresponding plurality of successive first and second signals correspond to values that pass the upshift threshold value and a most recent second signal is detected by the signal detector.

6. The apparatus according to claim 5 wherein the control unit provides the signal to upshift the bicycle transmission only after the plurality of time intervals correspond to values that are less than the upshift threshold value.

7. The apparatus according to claim 1 wherein the threshold setting unit sets an upshift threshold value, wherein the control unit provides a signal to upshift the bicycle transmission only after the time interval between the successive first and second signals corresponds to a value that passes the upshift threshold value and the second signal is detected by the signal detector, wherein the threshold setting unit sets a first downshift threshold value, and wherein the control unit provides a signal to downshift the bicycle transmission only after the time interval between the successive first and second signals corresponds to a value that passes the first downshift threshold value and the second signal is detected by the signal detector.

8. The apparatus according to claim 7 wherein the control unit provides the signal to upshift the bicycle transmission only after a plurality of time intervals between a corresponding plurality of successive first and second signals correspond to values that pass the upshift threshold value and a most recent second signal is detected by the signal detector.

9. The apparatus according to claim 8 wherein the control unit provides the signal to upshift the bicycle transmission only after the plurality of time intervals correspond to values that are less than the upshift threshold value.

10. The apparatus according to claim 1 wherein the signal detector is structured to detect signals corresponding to a wheel speed of the bicycle.

11. The apparatus according to claim 1 wherein the control unit is disposed in an electronically controlled shift control device for the bicycle.

12. The apparatus according to claim 1 wherein the signals comprise pulses.

13. The apparatus according to claim 12 wherein the signals comprise magnetic pulses.

14. A shift control apparatus for a bicycle transmission comprising:
    a signal detector that detects signals corresponding to motion of the bicycle;
    a threshold setting unit that sets a shift threshold value;

a time interval calculating unit that calculates time intervals after the signals are detected;

a control unit that provides a signal to change a gear in the bicycle transmission only after a time interval between successive first and second signals corresponds to a value that passes the shift threshold value and the second signal is detected by the signal detector;

wherein the threshold setting unit sets a first downshift threshold value;

wherein the control unit provides a signal to downshift the bicycle transmission only after the time interval between the successive first and second signals corresponds to a value that passes the first downshift threshold value and the second signal is detected by the signal detector;

wherein the threshold setting unit sets a second downshift threshold value that is different from the first downshift threshold value, and wherein the control unit provides the signal to downshift the bicycle transmission only after a plurality of time intervals between a corresponding plurality of successive first and second signals correspond to values that are between the first and second downshift threshold values and a most recent second signal is detected by the signal detector.

15. The apparatus according to claim 14 wherein the control unit provides the signal to downshift the bicycle transmission after only one time interval between successive first and second signals corresponds to a value that passes the first downshift threshold value and the second signal is detected by the signal detector.

16. The apparatus according to claim 15 wherein the control unit provides the signal to downshift the bicycle transmission after only one time interval between successive first and second signals corresponds to a value that is greater than the first downshift threshold value.

17. A shift control apparatus for a bicycle transmission comprising:

a signal detector that detects signals corresponding to motion of the bicycle;

a threshold setting unit that sets a shift threshold value;

a time interval calculating unit that calculates time intervals after the signals are detected;

a control unit that provides a signal to change a gear in the bicycle transmission only after the time interval between the successive first and second signals corresponds to a value that passes the shift threshold value and the second signal is detected by the signal detector;

wherein the threshold setting unit sets an upshift threshold value;

wherein the control unit provides a signal to upshift the bicycle transmission only after the time interval between the successive first and second signals corresponds to a value that passes the upshift threshold value and the second signal is detected by the signal detector;

wherein the threshold setting unit sets a first downshift threshold value;

wherein the control unit provides a signal to downshift the bicycle transmission only after the time interval between the successive first and second signals corresponds to a value that passes the first downshift threshold value and the second signal is detected by the signal detector;

wherein the threshold setting unit sets a second downshift threshold value that is different from the first downshift threshold value, and wherein the control unit provides the signal to downshift the bicycle transmission only after a plurality of time intervals between a corresponding plurality of successive first and second signals correspond to values that are between the first and second downshift threshold values and a most recent second signal is detected by the signal detector.

18. The apparatus according to claim 17 wherein the control unit provides the signal to downshift the bicycle transmission after only one time interval between successive first and second signals corresponds to a value that passes the first downshift threshold value and the second signal is detected by the signal detector.

19. The apparatus according to claim 18 wherein the control unit provides the signal to upshift the bicycle transmission only after a plurality of time intervals between a corresponding plurality of successive first and second signals correspond to values that pass the upshift threshold value and a most recent second signal is detected by the signal detector.

20. The apparatus according to claim 19 wherein the control unit provides the signal to downshift the bicycle transmission after only one time interval between successive first and second signals corresponds to a value that is greater than the first downshift threshold value, and wherein the control unit provides the signal to upshift the bicycle transmission only after the plurality of time intervals correspond to values that are less than the upshift threshold value.

* * * * *